United States Patent
Liu et al.

(10) Patent No.: US 10,518,373 B2
(45) Date of Patent: Dec. 31, 2019

(54) FLEXIBLE CLAMPING DEVICE

(71) Applicant: CITIC Dicastal CO., LTD, Qinhuangdao (CN)

(72) Inventors: Weidong Liu, Qinhuangdao (CN); Fengyan Liu, Qinhuangdao (CN); Jiandong Guo, Qinhuangdao (CN); Xiao Liu, Qinhuangdao (CN); Yao Zheng, Qinhuangdao (CN); Yongwang Zhao, Qinhuangdao (CN); Honghai Zhou, Qinhuangdao (CN)

(73) Assignee: CITIC DICASTAL CO. LTD, Qinhuangdao, Hebei (CN)

( * ) Notice: Subject to any disclaimer, the term of this patent is extended or adjusted under 35 U.S.C. 154(b) by 161 days.

(21) Appl. No.: 15/605,491

(22) Filed: May 25, 2017

(65) Prior Publication Data
US 2018/0243871 A1    Aug. 30, 2018

(30) Foreign Application Priority Data

Feb. 24, 2017    (CN) .................. 2017 1 01037191

(51) Int. Cl.
| | | |
|---|---|---|
| B23Q 3/10 | (2006.01) | |
| B23Q 3/06 | (2006.01) | |
| B23Q 1/52 | (2006.01) | |
| B23B 31/28 | (2006.01) | |

(52) U.S. Cl.
CPC ............. B23Q 3/107 (2013.01); B23Q 1/525 (2013.01); B23Q 3/062 (2013.01); *B23B 31/28* (2013.01); *B23Q 3/106* (2013.01)

(58) Field of Classification Search
CPC ........ B23Q 3/107; B23Q 1/525; B23Q 3/062; B23Q 3/06; B25B 23/0064; B23B 2260/11; B23B 31/28
USPC .......................................... 81/429
See application file for complete search history.

(56) References Cited

U.S. PATENT DOCUMENTS

| | | | | |
|---|---|---|---|---|
| 3,710,832 | A * | 1/1973 | Lafferty, Sr. ........ | B25B 23/0064 81/429 |
| 7,137,324 | B2 * | 11/2006 | Ludwig ................ | B25B 23/141 81/475 |
| 9,562,831 | B2 * | 2/2017 | Bowen ................. | G01M 3/103 |
| 2014/0209212 | A1 * | 7/2014 | Dale ..................... | B27B 29/00 144/250.13 |
| 2014/0311283 | A1 * | 10/2014 | Cocks .................. | F16P 1/02 74/608 |
| 2014/0361478 | A1 * | 12/2014 | Fukui ................... | B25B 5/04 269/226 |
| 2015/0048565 | A1 * | 2/2015 | Deininger ............ | B23B 31/28 269/226 |

(Continued)

*Primary Examiner* — Monica S Carter
*Assistant Examiner* — Mahdi H Nejad
(74) *Attorney, Agent, or Firm* — Calfee, Halter & Griswold LLP

(57) ABSTRACT

The present application discloses a flexible clamping device. A sleeve is fixed on a base, an adjusting shaft is connected with a mandrel and the sleeve respectively, the mandrel is fixed on the upper end face of the adjusting shaft, and the bottom outer wall of the adjusting shaft is in small clearance fit with the inner wall of the sleeve; a lock screw is installed on the upper right side wall of the sleeve, a pinion is installed on the upper left side wall of the sleeve via a rotating shaft, saw teeth are provided on the side wall of a adjusting shaft, and the pinion can be engaged with the side teeth of the adjusting shaft.

1 Claim, 2 Drawing Sheets

(56) References Cited

U.S. PATENT DOCUMENTS

| | | | |
|---|---|---|---|
| 2016/0141201 A1* | 5/2016 | Toyomura | H01L 21/68728 269/55 |
| 2016/0184955 A1* | 6/2016 | Xue | B24B 9/04 451/283 |
| 2016/0207174 A1* | 7/2016 | Liu | B23Q 3/062 |
| 2016/0226337 A1* | 8/2016 | Rudy | B23B 31/261 |
| 2016/0361787 A1* | 12/2016 | Yang | B23Q 3/062 |
| 2017/0182615 A1* | 6/2017 | Xue | B24B 9/04 |
| 2018/0200805 A1* | 7/2018 | Xue | B23B 41/00 |
| 2018/0368902 A1* | 12/2018 | Milor | A61B 17/8875 |

\* cited by examiner

FLEXIBLE CLAMPING DEVICE

CROSS-REFERENCE TO RELATED APPLICATIONS

This application claims priority to Chinese Patent Application No. 201710103719.1, filed on Feb. 24, 2017, which is hereby incorporated by reference in its entirety.

TECHNICAL FIELD

The present application relates to a machining clamping mechanism, and specifically to a flexible clamping mechanism in the wheel machining process.

BACKGROUND ART

In the practical production process, because the number of wheel types machined in automobile wheel manufactures is relatively large, the wheel types are replaced very frequently. In order to meet the requirement for machining wheels of different sizes, the wheel manufactures need to manufacture and store a large amount of work fixtures, thereby increasing the purchase cost and reducing the production efficiency.

SUMMARY OF THE INVENTION

An object of the subject matter is to provide a flexible clamping device, which may meet the machining requirements of wheels by adjusting the positions of internal structures according to the dimensional changes of wheels.

In order to achieve the above object, the subject matter adopts the technical solution: a flexible clamping device comprises a base, a sleeve, a support, adjusting screws, an adjusting ring, a spring, a support frame, a limiting screw, a mandrel, a flange, a rotating shaft, a pinion, a lock screw and an adjusting shaft.

The sleeve is fixed on the base, the adjusting shaft is connected with the mandrel and the sleeve respectively, the mandrel is fixed on the upper end face of the adjusting shaft, and the bottom outer wall of the adjusting shaft is in small clearance fit with the inner wall of the sleeve. The lock screw is installed on the upper right side wall of the sleeve, the pinion is installed on the upper left side wall of the sleeve via the rotating shaft, saw teeth are provided on the side wall of the adjusting shaft, and the pinion can be engaged with the side teeth of the adjusting shaft.

The rotating shaft drives the pinion to rotate, and the height of the mandrel is adjusted by engagement of the pinion and the side teeth of the adjusting shaft, so as to meet the clamping requirement for clamping wheels of different rim depths.

A 3 mm gap is provided in the upper right side wall of the sleeve, threads are provided on one side of the gap, and the lock screw penetrates through the gap and is in threaded connection with the threads on the other side of the gap. After the height of the mandrel is adjusted via the pinion, the lock screw is tightened, the diameter of the inner wall of the sleeve is reduced, the inner wall of the sleeve clasps the adjusting shaft, and the position of the mandrel is locked.

The support is fixed on the base, the bottom inner wall of the adjusting ring is in threaded fit with the middle outer wall of the support, and the adjusting ring is configured to move up and down on the support. The four adjusting screws are installed on the side wall of the adjusting ring, the front end faces of the adjusting screws is configured to press the outer wall of the support, and the adjusting ring is fixed at a certain position of the support.

The support frame is sleeved on the support, the flange is fixed on the upper end face of the support frame, and two symmetrical vertical grooves are formed in the upper side walls of the support frame. The limiting screw is installed on the support and penetrates through the vertical grooves in the side walls of the support frame, and the limiting screw is configured to move relatively in the support frame and limits the moving range of the support frame on the support.

The spring is arranged on the support in a penetrating manner, the two ends of the spring are connected with the support frame and the adjusting ring respectively, the adjusting ring supports the support frame via the spring, and the spring has elasticity under the action of gravity of the support frame.

The bottom inner wall of the adjusting ring is in threaded fit with the outer wall of the support, the adjusting ring can drive the spring and the flange to move up and down, and the adjusting ring is fixed at a certain position of the support by the adjusting screws.

The subject matter may meet the requirements of wheel manufacturing enterprises for machining wheels, improve the quality of wheels, and simultaneously has the characteristics of simple structure, convenience in manufacturing, stable performance, high precision meeting the machining requirement and low manufacturing cost.

Figure 1:
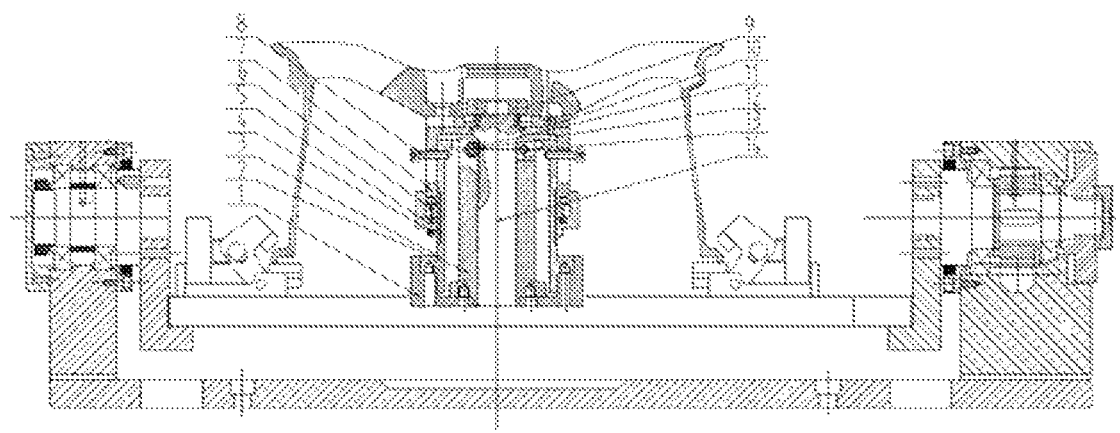
FIG. 1 is a working schematic diagram of a flexible clamping device of the present application.
Figure 2:
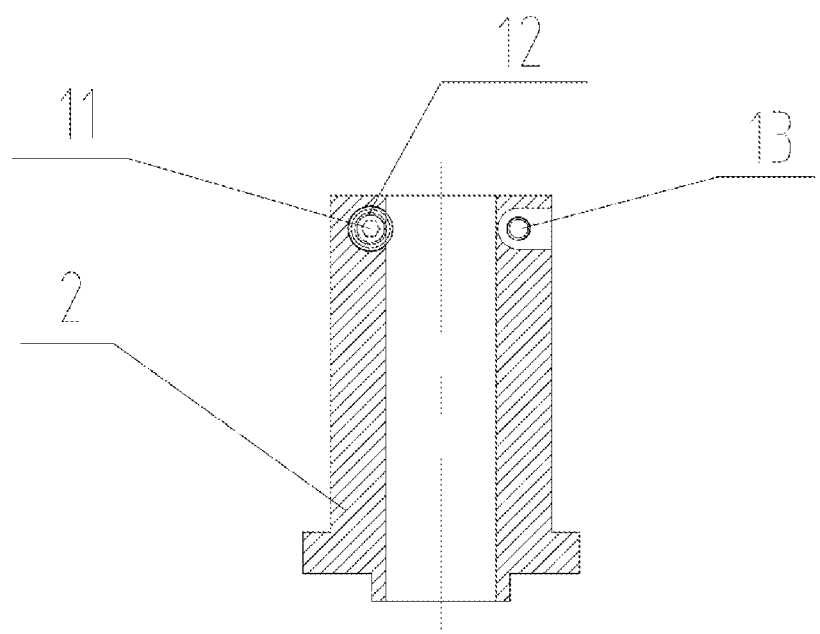
FIG. 2 is a schematic diagram of a sleeve in the flexible clamping device of the present application.
Figure 3:
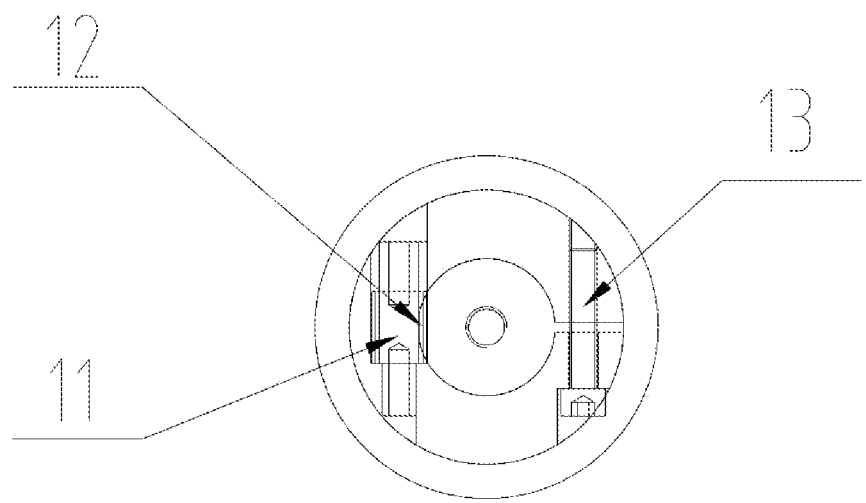
FIG. 3 is a schematic top view of the sleeve in the flexible clamping device of the present application.
Figure 4:
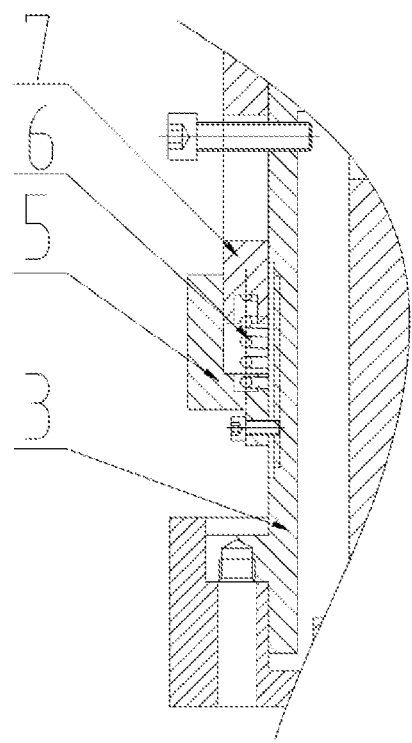
FIG. 4 is a schematic diagram of a location of a support frame relative to an adjusting ring in the flexible clamping device of the present application.

In figures: 1—base, 2—sleeve, 3—support, 4—adjusting screw, 5—adjusting ring, 6—spring, 7—support frame, 8—limiting screw, 9—mandrel, 10—flange, 11—rotating shaft, 12—pinion, 13—lock screw, 14—adjusting shaft.

DETAILED DESCRIPTION OF THE INVENTION

A specific device provided by the present application will be described in detail below in combination with the accompanying drawings.

A flexible clamping device is composed of a base 1, a sleeve 2, a support 3, adjusting screws 4, an adjusting ring 5, a spring 6, a support frame 7, a limiting screw 8, a mandrel 9, a flange 10, a rotating shaft 11, a pinion 12, a lock screw 13 and an adjusting shaft 14.

The sleeve 2 is fixed on the base 1, the adjusting shaft 14 is connected with the mandrel 9 and the sleeve 2 respectively, the mandrel 9 is fixed on the upper end face of the adjusting shaft 14, and the bottom outer wall of the adjusting shaft 14 is in small clearance fit with the inner wall of the sleeve 2. The lock screw 13 is installed on the upper right side wall of the sleeve 2, the pinion 12 is installed on the upper left side wall of the sleeve 2 via the rotating shaft 11, saw teeth are provided on the side wall of the adjusting shaft 14, and the pinion 12 can be engaged with the side teeth of the adjusting shaft 14.

The rotating shaft 11 drives the pinion 12 to rotate, and the height of the mandrel 9 is adjusted by engagement of the pinion 12 and the side teeth of the adjusting shaft 14, so as to meet the clamping requirement for clamping wheels of different rim depths.

A 3 mm gap is provided in the upper right side wall of the sleeve 2, threads are provided on one side of the gap, and the lock screw 13 penetrates through the gap and is in threaded connection with the threads on the other side of the gap. After the height of the mandrel 9 is adjusted via the pinion 12, the lock screw 13 is tightened, the diameter of the inner wall of the sleeve 2 is reduced, the inner wall of the sleeve 2 clasps the adjusting shaft 14, and the position of the mandrel 9 is locked.

The support 3 is fixed on the base 1, the bottom inner wall of the adjusting ring 5 is in threaded fit with the middle outer wall of the support 3, and the adjusting ring 5 is configured to move up and down on the support 3. The four adjusting screws 4 are installed on the side wall of the adjusting ring 5, the front end faces of the adjusting screws 4 is configured to press the outer wall of the support 3, and the adjusting ring 5 is fixed at a certain position of the support 3.

The support frame 7 is sleeved on the support 3, the flange 10 is fixed on the upper end face of the support frame 7, and two symmetrical vertical grooves are formed in the upper side walls of the support frame 7. The limiting screw 8 is installed on the support 3 and penetrates through the vertical grooves in the side walls of the support frame 7, and the limiting screw 8 is configured to move relatively in the support frame 7 and limits the moving range of the support frame 7 on the support 3.

The spring 6 is arranged on the support 3 in a penetrating manner, two ends of the spring 6 are connected with the support frame 7 and the adjusting ring 5 respectively, the adjusting ring 5 supports the support frame 7 via the spring 6, and the spring 6 has elasticity under the action of gravity of the support frame 7.

The bottom inner wall of the adjusting ring 5 is in threaded fit with the outer wall of the support 3, the adjusting ring 5 can drive the spring 6 and the flange 10 to move up and down, and the adjusting ring 5 is fixed at a certain position of the support 3 by the adjusting screws 4.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flexible clamping device, comprising a base, a sleeve, a support, four adjusting screws, an adjusting ring, a spring, a support frame, a limiting screw, a mandrel, a flange, a rotating shaft, a pinion, a lock screw and an adjusting shaft, wherein the sleeve is immovably fixed on the base, the adjusting shaft is connected with the mandrel and the sleeve respectively, the mandrel is fixed on an upper end face of the adjusting shaft, and a bottom outer wall of the adjusting shaft is in small clearance fit with an inner wall of the sleeve; the lock screw is installed on an upper right side wall of the sleeve, the pinion is installed an upper left side wall of the sleeve via the rotating shaft, saw teeth are provided on the side wall of the adjusting shaft, and the pinion is configured to be engaged with the side teeth of the adjusting shaft;

a 3 mm gap is provided in the upper right side wall of the sleeve, threads are provided on one side of the gap, and the lock screw penetrates through the gap and is in threaded connection with the threads on the other side of the gap;

the support is fixed on the base, a bottom inner wall of the adjusting ring is in threaded fit with a middle outer wall of the support, and the adjusting ring is configured to move up and down on the support; the four adjusting screws are installed on a side wall of the adjusting ring, the front end faces of the adjusting screws are configured to press an outer wall of the support, and the adjusting ring is fixed at a certain position of the support;

the support frame is sleeved on the support, the flange is fixed on an upper end face of the support frame, and two symmetrical vertical grooves are formed in upper side walls of the support frame; the limiting screw is installed on the support;

the spring is arranged on the support in a penetrating manner, two ends of the spring are connected with the support frame and the adjusting ring respectively, and the adjusting ring supports the support frame via the spring;

the bottom inner wall of the adjusting ring is in threaded fit with the outer wall of the support.

* * * * *